United States Patent
Huang et al.

(10) Patent No.: US 11,421,088 B2
(45) Date of Patent: **\*Aug. 23, 2022**

(54) METHOD OF PREPARING POLYESTER ELASTOMER COMPOSITE MEMBRANE WITH HIGH BONDING STRENGTH

(71) Applicant: Taiwan Textile Federation, R.O.C., Taipei (TW)

(72) Inventors: Shu-Hui Huang, Taipei (TW); Sheng-Jen Lin, Taipei (TW); Yao-Hung Kuo, Taipei (TW); Jian-Fan Chen, Taipei (TW); Yun-Chin Kuo, Taipei (TW); Yu-Chuan Lin, Taipei (TW)

(73) Assignee: TAIWAN TEXTILE FEDERATION, R.O.C., Taipei (TW)

(\*) Notice: Subject to any disclaimer, the term of this patent is extended or adjusted under 35 U.S.C. 154(b) by 190 days.

This patent is subject to a terminal disclaimer.

(21) Appl. No.: 16/885,124

(22) Filed: May 27, 2020

(65) Prior Publication Data

US 2021/0371610 A1    Dec. 2, 2021

(51) Int. Cl.
| | | |
|---|---|---|
| *C08J 5/18* | (2006.01) | |
| *C08K 5/18* | (2006.01) | |

(Continued)

(52) U.S. Cl.
CPC ............. *C08J 5/18* (2013.01); *B29C 45/0001* (2013.01); *B32B 27/36* (2013.01); *C08K 5/18* (2013.01); *B29C 45/16* (2013.01); *B29K 2021/00* (2013.01); *B29K 2021/003* (2013.01); *B29K 2067/00* (2013.01); *B29L 2031/755* (2013.01); *B32B 27/18* (2013.01); *B32B 37/15* (2013.01);

(Continued)

(58) Field of Classification Search
None
See application file for complete search history.

(56) References Cited

U.S. PATENT DOCUMENTS

| | | | | |
|---|---|---|---|---|
| 2007/0065673 | A1* | 3/2007 | Nanba | B32B 27/32 |
| | | | | 525/419 |
| 2019/0136052 | A1* | 5/2019 | Chino | C08L 23/00 |

(Continued)

FOREIGN PATENT DOCUMENTS

| | | | |
|---|---|---|---|
| JP | 07-179733 A | * | 7/1995 |
| JP | 2011-230503 A | * | 11/2011 |

(Continued)

*Primary Examiner* — Vivian Chen
(74) *Attorney, Agent, or Firm* — Chun-Ming Shih; HDLS IPR Services

(57) ABSTRACT

A method of preparing thermoplastic polyester elastomer membrane with high binding strength includes the following steps: (a) Adding a reaction solvent to TPEE powder or granules to prepare a solvent mixture. (b) Adding a modifier to the solvent mixture, and mixing uniformly to prepare a first mixture, the modifier including at least one of o-xylylenediamine, m-xylylenediamine, alpha,alpha'-diamino-p-xylene, 2,3,5,6-Tetrachloro-p-xylene-alpha,alpha'-diamine, and 1,3,5,7-Tetraazatricyclodecane. (c) Adding an initiator to the first mixture, and mixing uniformly to prepare a second mixture. (d) Obtaining a finished product by passing the second mixture through an injection laminating process.

6 Claims, 2 Drawing Sheets

(51) Int. Cl.
  *B32B 27/36* (2006.01)
  *B29C 45/00* (2006.01)
  *B29L 31/00* (2006.01)
  *C08K 5/3467* (2006.01)
  *B32B 27/18* (2006.01)
  *C08K 5/17* (2006.01)
  *B32B 37/15* (2006.01)
  *B29C 45/16* (2006.01)
  *B29K 21/00* (2006.01)
  *C08J 3/09* (2006.01)
  *B29K 67/00* (2006.01)
  *C08J 3/11* (2006.01)
  *C08G 63/66* (2006.01)
  *C08K 5/34* (2006.01)
  *C08G 63/91* (2006.01)
(52) U.S. Cl.
  CPC ......... *B32B 37/153* (2013.01); *B32B 2250/02* (2013.01); *B32B 2250/244* (2013.01); *B32B 2367/00* (2013.01); *C08G 63/66* (2013.01); *C08G 63/91* (2013.01); *C08J 3/09* (2013.01); *C08J 3/095* (2013.01); *C08J 3/11* (2013.01); *C08J 2367/00* (2013.01); *C08K 5/17* (2013.01); *C08K 5/34* (2013.01); *C08K 5/3467* (2013.01)

(56) References Cited

U.S. PATENT DOCUMENTS

2021/0371607 A1\* 12/2021 Huang .................. B32B 27/36
2021/0372018 A1\* 12/2021 Huang .................. C08G 63/91

FOREIGN PATENT DOCUMENTS

JP      2012-020571 A    \*  2/2012
JP      WO 2012/132084 A \*  10/2012

\* cited by examiner

METHOD OF PREPARING POLYESTER ELASTOMER COMPOSITE MEMBRANE WITH HIGH BONDING STRENGTH

BACKGROUND

Technical Field

The present disclosure relates to a method of preparing polyester elastomer composite membrane with high bonding strength, and more particularly to a method of preparing polyester elastomer composite membrane that has similar material characteristics with polyester fiber.

Description of Related Art

The statements in this section merely provide background information related to the present disclosure and do not necessarily constitute prior art.

In present social environment, due to the rise of environmental protection awareness, more and more attention is paid to product recycling capabilities, and whether secondary environmental pollution will be caused after recycling. Now, most of the strips used for the bonding between textile materials of textiles are made of thermosetting polyurethane (PU) or thermoplastic polyurethane elastomer (TPU), and most of them have di-isocyanate, which are highly toxic and easily cause environmental pollution and human organ damage. Moreover, because the strips are not environmentally friendly materials, when the textiles are melted and recycled, the thermosetting polyurethane or the thermoplastic polyurethane elastomer generates residues due to melting, resulting in a situation in which recovery is not easy.

Although the material of the thermoplastic polyester elastomer (TPEE) and the material of the polyester fiber commonly used in textile products are approximately the same material, their application in polyester fiber material should have better compatibility. However, due to the poor conformability and elastic recovery rate of TPEE material, there is no related application that uses the TPEE as a bonding material of the polyester fiber.

Therefore, how to design a method of preparing polyester elastomer composite membrane with high bonding strength, which modifies the TPEE film by a compound to improve bonding strength and elastic recovery rate of the polyester elastomer composite membrane, is an important subject studied by the inventor of the present disclosure.

SUMMARY

In order to solve the above problems, the present disclosure provides a method of preparing polyester elastomer composite membrane with high bonding strength to overcome the problems in the prior art. The method of preparing polyester elastomer composite membrane with high bonding strength includes the following steps: Adding a reaction solvent with 0.5-20 parts by weight to thermoplastic polyester elastomer (TPEE) powder or granules to prepare a solvent mixture, the reaction solvent is methyl formate or ethyl acetate. Adding a modifier with 0.5-10 parts by weight to the solvent mixture, and mixing uniformly to prepare a first mixture, the modifier including at least one of o-xylylenediamine, m-xylylenediamine, alpha,alpha'-diamino-p-xylene, 2,3,5,6-Tetrachloro-p-xylene-alpha,alpha'-diamine, and 1,3,5,7-Tetraazatricyclodecane. Adding an initiator with 0.5-20 parts by weight to the first mixture, and mixing uniformly to prepare a second mixture, the initiator including a photo initiator or a thermal initiator. Drying the second mixture in an environment with a temperature between 95° C. to 115° C., and preparing the polyester elastomer composite membrane through an injection laminating process.

Further, a weight average molecular weight of the TPEE powder or granules is between 10000 and 30000, the Shore hardness of the TPEE powder or granules is between 50 A and 100 A, and a melting point of the TPEE powder or granules with a temperature between 40° C. to 180° C.

Further, the reaction solvent with 10 parts by weight, the modifier with 5 parts by weight, and the initiator with 10 parts by weight.

Further, the initiator and the first mixture are uniformly mixed as the second mixture at a rotation speed between 3 rpm to 7 rpm and at a temperature between 160° C. to 200° C.

Further, the rotation speed is 5 rpm, and the temperature is 180° C.

Further, the injection laminating process is to laminate the second mixture at a rate of 4-6 meters per minute to prepare the polyester elastomer composite membrane.

Further, the second mixture dried in an environment with a temperature is 105° C.

A main purpose and effect of the present disclosure is that, because of the material of the TPEE and the material the polyester fiber commonly used in textile products are approximately the same material. Therefore, when the polyester elastomer composite membrane is attached to clothing made by TPEE, the materials are approximately the same, so there has high compatibility and high bonding strength after bonding both. Furthermore, the water pressure that can be withstood at bonding part can reach more than 10000 mm $H_2O$.

In order to further understand the techniques, means, and effects of the present disclosure for achieving the intended purpose. Please refer to the following detailed description and drawings of the present disclosure. The drawings are provided for reference and description only, and are not intended to limit the present disclosure.

DETAILED DESCRIPTION

Figure 1:
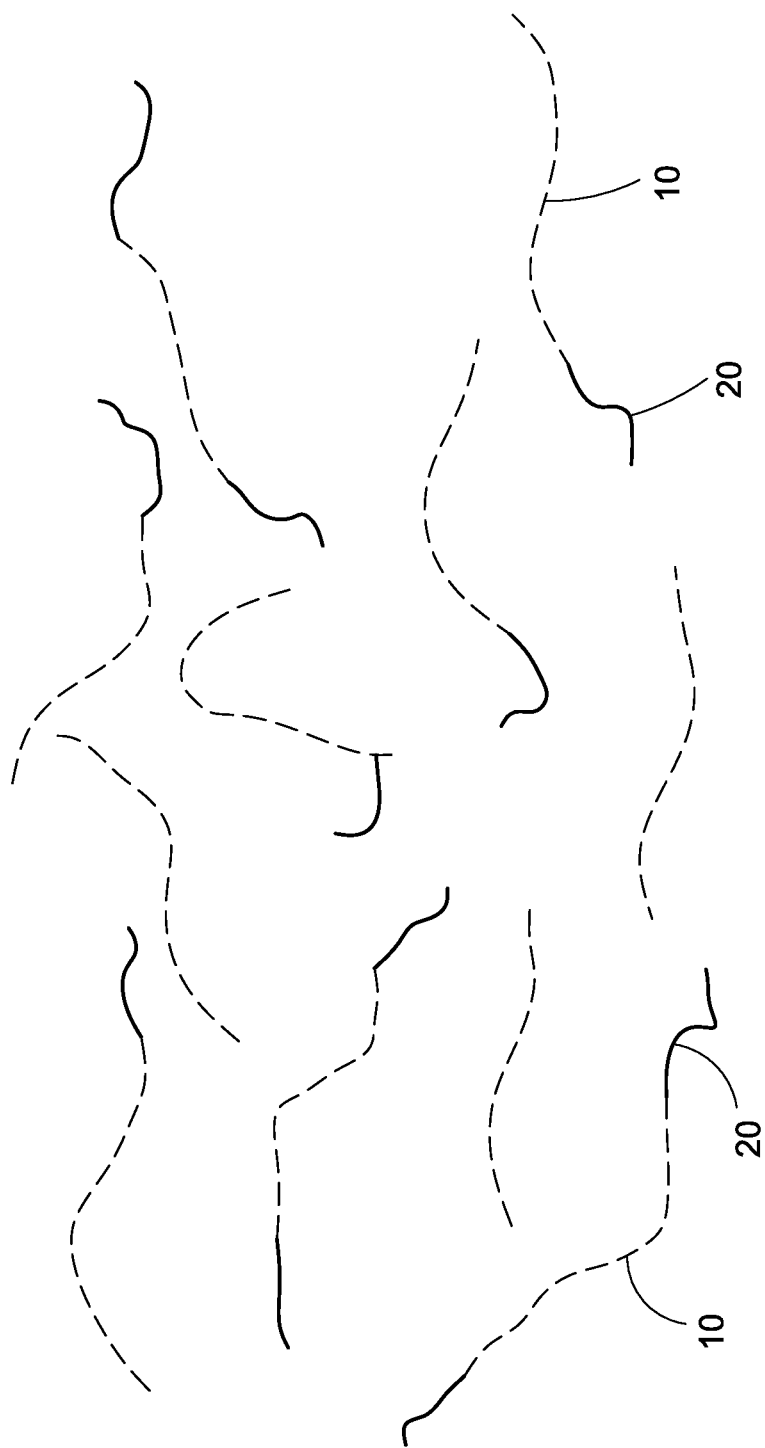
FIG. 1 is a schematic structural diagram of a polyester elastomer composite membrane with high bonding strength.

The technical content and detailed description of the present disclosure will be described below in conjunction with the drawings.

The present disclosure provides a method of preparing polyester elastomer composite membrane with high bonding strength, the method includes the following steps: (a) Adding a reaction solvent with 0.5-20 parts by weight to thermoplastic polyester elastomer (TPEE) powder or granules to prepare a solvent mixture, the reaction solvent is methyl formate or ethyl acetate. (b) Adding a modifier with 0.5-10 parts by weight to the solvent mixture, and mixing uniformly to prepare a first mixture, the modifier including at least one of o-xylylenediamine, m-xylylenediamine, alpha,alpha'-diamino-p-xylene, 2,3,5,6-Tetrachloro-p-xylene-alpha,alpha'-diamine, and 1,3,5,7-Tetraazatricyclodecane. (c) Adding an initiator with 0.5-20 parts by weight to the first mixture, and mixing uniformly to prepare a second mixture, the initiator including a photo initiator or a thermal initiator. (d) Drying the second mixture in an environment with a temperature between 95° C. to 115° C., and preparing the polyester elastomer composite membrane through an injection laminating process.

Specifically, in step (a), a weight average molecular weight of the TPEE powder or granules is between 10000 and 30000, the Shore hardness of the TPEE powder or granules is between 50 A and 100 A, and a melting point of the TPEE powder or granules with a temperature between 40° C. to 180° C. The chemical structure of the TPEE powder or granules as follows:

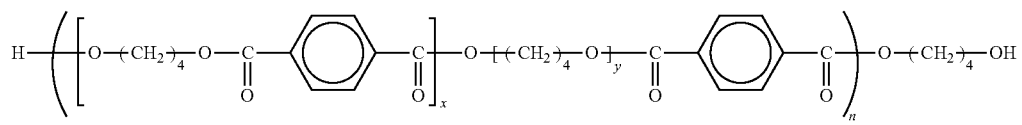

The reaction solvent can be methyl formate or ethyl acetate, the addition range of the reaction solvent is between 0.5-20 parts by weight (relative to the TPEE powder or granules) to produce better solvent mixture, and the quality of the polyester elastomer composite membrane produced by the solvent mixture is also better. When addition amount of the reaction solvent is 10 parts by weight, the quality of the produced solvent mixture and the corresponding polyester elastomer composite membrane produced is the best.

In one embodiment of the present disclosure, the value of the weight average molecular weight of the TPEE powder or granules is only the optimal value for preparing the polyester elastomer composite membrane. The TPEE powder or granules using the above values have better bonding strength and elastic recovery rate, but the present disclosure is not limited thereto. For example, a weight average molecular weight of the TPEE powder or granules is between 30000 and 100000 to prepare the polyester elastomer composite membrane.

In step (b), the modifier can use o-xylylenediamine with the chemical structure as follows:

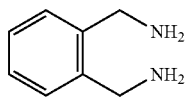

The chemical structure of m-xylylenediamine as follows:

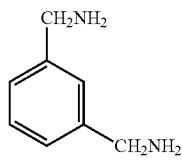

The chemical structure of alpha, alpha'-diamino-p-xylene as follows:

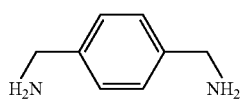

And the chemical structure of 1,3,5,7-Tetraazatricyclodecane as follows:

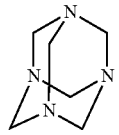

In alpha, alpha'-diamino-p-xylene, the other part of the benzene ring is connected to chlorine (that is, the position of the benzene ring 2, 3, 5, 6), so that it constitutes 2,3,5,6-Tetrachloro-p-xylene-alpha, alpha'-diamine which includes chlorine, and the chemical structure of the 2,3,5,6-Tetrachloro-p-xylene-alpha, alpha'-diamine as follows:

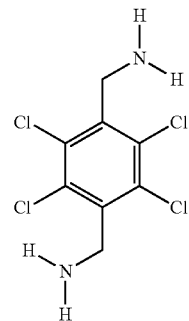 [SMILES: NCc1c(Cl)c(Cl)c(CN)c(Cl)c1Cl]

The modifier is a main raw material for grafting TPEE and modifying TPEE. The addition range of modifiers is between 0.5-10 parts by weight (relative to the TPEE powder or granules) to produce better first mixture, and the quality of the polyester elastomer composite membrane produced by the first mixture is also better. Specifically, when addition amount of the modifier is insufficient (for example, less than 0.5 parts by weight), the range of chemical reaction is too small, resulting in the finished product as an unmodified TPEE. Therefore, the bonding strength and elastic recovery rate of the finished product will be same as the unmodified TPEE. However, when addition amount of modifier used is too much (for example, more than 10 parts by weight), the reaction is excessive, which causes the modifier to disintegrate the characteristics of the TPEE. At this time, the finished product is relatively easy to break, and it will also make the finished product unable to smoothly fit on the textile material. Therefore, in order to improve the yield of the finished product during preparation, the addition range of the modifier is preferably 0.5-10 parts by weight. When the addition amount of the modifier is 5 parts by weight, the quality of the first mixture and the polyester elastomer composite membrane is the best.

In step (c), the initiator may be a photo initiator or a thermal initiator, and may be potassium persulfate, azobisisobutyronitrile or benzyldimethylketal is the preferred type of initiator. The addition range of the initiator ranges from 0.5-20 parts by weight (relative to the TPEE powder or granules) to produce a better second mixture. Specifically, a polymerization reaction of polymers does not occur for no reason, a mechanism that drives the polymerization reaction is often required. This mechanism requires energy such as light or heat to excite the monomer of the polymer to become an active center of chemical reaction, thereby starting the polymerization reaction. However, if the addition amount of the initiator is insufficient (for example, less than 3 parts by weight), the polymerization reaction is incomplete, so that the yield of the finished product decreases. If the addition amount of the initiator is too much (for example, more than 7 parts by weight), it will cause defects such as excessive chain ends of the molecular chains of the polymer, and also reduce the yield of the finished product. Therefore, the addition range of the initiator is preferably 0.5-20 parts by weight. When the addition range of the initiator is 10 parts by weight, the quality of the second mixture and the polyester elastomer composite membrane is the best.

In order to uniformly mix and fully react, an apparatus for mixing can be set under a mixing environment with a rotation speed of 3 rpm to 7 rpm, a temperature of 160° C. to 200° C., and the initiator and the first mixture are uniformly mixed as the second mixture. After the above-mentioned uniformly mixing, the modified molecular chain can fully react to graft one or both ends of the polyester polymer chain. When the rotation speed is set at 5 rpm and the temperature is set at 180° C., there has the best reaction efficiency.

In step (d), the second mixture after being uniformly mixed needs to be dried in an environment with a temperature of 95° C. to 115° C. to reduce moisture content of the second mixture. It is beneficial to the quality of the polyester elastomer composite membrane preparation during the injection laminating process. Specifically, when the water content of the second mixture is too much, the fluidity of injected material will be too high, and the thickness of a membrane produced is susceptible to fluidity and unevenness. If the water content is insufficient, the fluidity of the injected material will be insufficient, which will cause the injected material to not flow easily and easily produce blocky defective products. Therefore, the second mixture can control the water content at 500 ppm-1000 ppm as a better value. When the drying temperature is set under the environment of 105° C., the control of the moisture content of the second mixture and the drying rate are the best.

After the second mixture is dried to adjust to an appropriate moisture content, the dried second mixture is performed an injection laminating process on conveying substrate by an injection laminating equipment. The conveying substrate moves at a speed of 4-6 meters per minute to produce a polyester elastomer composite membrane with better quality and thickness. Finally, the finished product of the injection laminating process can be cut into strips with appropriate width. Further, the width of the strips commonly used in this industry is preferably between 0.6 cm and 2 cm.

Please refer to FIG. 1. The FIG. 1 is a schematic structural diagram of a polyester elastomer composite membrane with high bonding strength. The polyester elastomer composite membrane 100 with high conformability and high elasticity observed by scanning electron microscope (SEM) includes a plurality of polyester polymer chains 10 (indicated by broken lines) and a plurality of modified molecular chains 20 (indicated by solid lines). Each polyester polymer chain 10 includes two ends, and the polyester polymer chains 10 are stacked to constitute a main body of the polyester elastomer composite membrane. The modified molecular chain 20 is grafted to one or both ends of the polyester polymer chain 10 respectively, and since the ratio of the modifier is less than the TPEE powder or granules, not every polyester polymer chain 10 is grafted to at least one modified molecular chain 20. If the weight part of the modified molecular chain 20 is higher, the number of modified molecular chains 20 will increase, and the proportion of the modified molecular chain 20 grafted to the polyester polymer chain 10 will be higher. The modified molecular chain 20 enhances the elasticity of the polyester elastomer composite membrane, and enhances the bonding strength when bonding with textiles and other materials, so that the polyester elastomer composite membrane can hold the textiles and other materials more firmly without falling off, and not easy to be deformed by external force.

The main purpose and effect of the present disclosure is that, because of the material of the TPEE and the material the polyester fiber commonly used in textile products are approximately the same material. Therefore, when the polyester elastomer composite membrane is attached to clothing made by TPEE, the materials are approximately the same, so there has high compatibility and high bonding strength after bonding both. Furthermore, the water pressure that can be withstood at bonding part can reach more than 10000 mm $H_2O$. In addition, since most of the materials attached to textiles are made of thermosetting polyurethane (PU) or thermoplastic polyurethanes (TPU), they cannot be melted together with textiles because of incompatibility with textile materials (when the thermosetting polyurethane or the thermoplastic polyurethane elastomer melts, residues are generated). Since the polyester elastomer composite membrane with high bonding strength of the present disclosure has material characteristics similar to those of textile materials, the clothes made therefrom can be directly melted and recovered together, so the effect of high recycling compatibility can be achieved. Furthermore, the secondary purpose and efficacy of the present disclosure is that, since today's society is more and more concerned about the non-toxic living environment, the polyester elastomer composite membrane produced of the disclosure does not add the highly toxic substances related to di-isocyanate. Therefore, the polyester elastomer composite membrane can be used to make textiles with non-toxic materials.

Example 1

Figure 2:
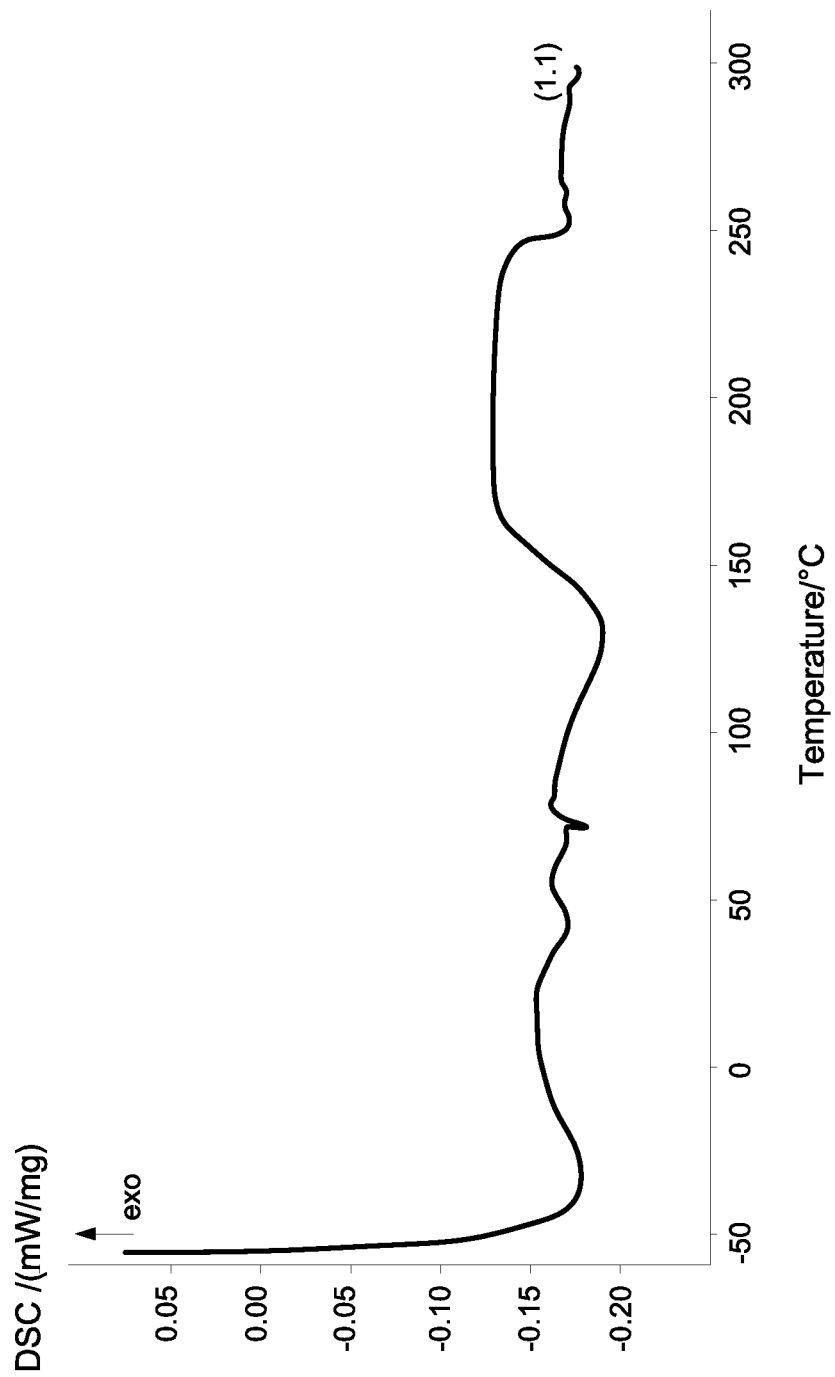
FIG. 2 is an analysis results diagram of the polyester elastomer composite membrane made by differential scanning calorimetry.

Adding ethyl acetate with 10 parts by weight to the TPEE powder or granules to prepare a solvent mixture, adding 2,3,5,6-Tetrachloro-p-xylene-alpha, alpha'-diamine with 5 parts by weight to the solvent mixture, and mixing uniformly to prepare a first mixture. And then, adding potassium sulfate with 10 parts by weight to the first mixture, and mixing uniformly in an environment with a rotation speed of 5 rpm and a temperature of 180° C. to prepare a second mixture. Finally, it is dried in an environment with a temperature of 105° C., and a speed of 5 m per minute of injection laminating process is performed to complete the preparation of the finished product of the polyester elastomer composite membrane. The finished product is analyzed by differential scanning calorimetry (DSC) as shown in FIG. 2. The test condition is 7 mg in weight, the temperature is between 25° C. to 350° C., and rise rate of the temperature is 10° C. per minute, it can be seen that the melting temperature of the finished product is about 130° C. The finished product was tested using the elastic recovery rate test of EN14704-1 and the peeling strength test of ISO 2411. The test conditions were 6×2 inch for the clamps, the distance between the upper clamp and lower clamp is 5 cm, the constant rate of extension (CRE) was 100 mm per minute, and use constant speed stretching to separate the polyester elastomer composite membrane from the attached substrate (base fabric) and detect the "peeling strength (kgf/cm)". The obtained parameters are shown in Table 1 below.

Example 2

Adding methyl formate with 20 parts by weight to the TPEE powder or granules to prepare a solvent mixture, adding m-xylylenediamine with 10 parts by weight to the solvent mixture, and mixing uniformly to prepare a first mixture. And then, adding azobisisobutyronitrile with 20 parts by weight to the first mixture, and mixing uniformly in an environment with a rotation speed of 7 rpm and a temperature of 200° C. to prepare a second mixture. Finally, it is dried in an environment with a temperature of 115° C., and a speed of 6 m per minute of injection laminating process is performed to complete the preparation of the finished product of the polyester elastomer composite membrane. The finished product is the same as the above test method, and the test results and parameters are shown in Table 1 below.

Example 3

Adding ethyl acetate with 0.5 parts by weight to the TPEE powder or granules to prepare a solvent mixture, adding o-xylylenediamine with 0.5 parts by weight to the solvent mixture, and mixing uniformly to prepare a first mixture. And then, adding azobisisobutyronitrile with 0.5 parts by weight to the first mixture, and mixing uniformly in an environment with a rotation speed of 3 rpm and a temperature of 150° C. to prepare a second mixture. Finally, it is dried in an environment with a temperature of 95, and a speed of 4 m per minute of injection laminating process is performed to complete the preparation of the finished product of the polyester elastomer composite membrane. The finished product is the same as the above test method, and the test results and parameters are shown in Table 1 below.

Example 4

Adding methyl formate with 5 parts by weight to the TPEE powder or granules to prepare a solvent mixture, adding alpha,alpha'-diamino-p-xylene with 7.5 parts by weight to the solvent mixture, and mixing uniformly to prepare a first mixture. And then, adding benzyldimethylketal with 5 parts by weight to the first mixture, and mixing uniformly in an environment with a rotation speed of 4 rpm and a temperature of 190° C. to prepare a second mixture. Finally, it is dried in an environment with a temperature of 110° C., and a speed of 5 m per minute of injection laminating process is performed to complete the preparation of the finished product of the polyester elastomer composite membrane. The finished product is the same as the above test method, and the test results and parameters are shown in Table 1 below.

Example 5

Adding ethyl acetate with 15 parts by weight to the TPEE powder or granules to prepare a solvent mixture, adding 1,3,5,7-Tetraazatricyclodecane with 2.5 parts by weight to the solvent mixture, and mixing uniformly to prepare a first mixture. And then, adding potassium persulfate with 15 parts by weight to the first mixture, and mixing uniformly in an environment with a rotation speed of 6 rpm and a temperature of 170° C. to prepare a second mixture. Finally, it is dried in an environment with a temperature of 100° C., and a speed of 6 m per minute of injection laminating process is performed to complete the preparation of the finished product of the polyester elastomer composite membrane. The finished product is the same as the above test method, and the test results and parameters are shown in Table 1 below.

Example 6

Adding methyl formate with 10 parts by weight to the TPEE powder or granules to prepare a solvent mixture, adding a modifier with 5 parts by weight to the solvent mixture, and mixing uniformly to prepare a first mixture. The modifier is prepared by adjusting the ratio of o-xylenediamine, m-xylylenediamine, alpha,alpha'-diamino-p-xylene, and 1,3,5,7-Tetraazatricyclodecane to 25%: 25%: 25%: 25%. And then, adding azobisisobutyronitrile with 10 parts by weight to the first mixture, and mixing uniformly in an environment with a rotation speed of 5 rpm and a temperature of 180° C. to prepare a second mixture. Finally, it is dried in an environment with a temperature of 105° C., and a speed of 4 m per minute of injection laminating process is performed to complete the preparation of the finished product of the polyester elastomer composite membrane. The finished product is the same as the above test method, and the test results and parameters are shown in Table 1 below.

Comparative Example

The TPEE powder or granules are directly prepared as a polyester elastomer composite membrane. The finished product is the same as the above test method, and the test results and parameters are shown in Table 1 below.

TABLE 1 test parameters of examples and a comparative example

| | Comparative Example | Example 1 | Example 2 | Example 3 | Example 4 | Example 5 | Example 6 |
|---|---|---|---|---|---|---|---|
| Melt Flow Index (M.I.) | 4.8 | 30.5 | 33.5 | 32.9 | 32.5 | 31.3 | 31.9 |
| TFB (° C.) | 205.8 | 140.9 | 135.9 | 136.2 | 136.8 | 138.2 | 137.9 |
| DSC (° C.) | 144.9 | 137.8 | 123.8 | 124.6 | 125.9 | 130.2 | 131.1 |
| Peeling strength 175° C./25 s (0.15 mm) (kgf/cm) | 0 | 3.1 | 3.6 | 3.6 | 3.5 | 3.2 | 3.3 |

TABLE 1-continued test parameters of examples and a comparative example

| | Comparative Example | Example 1 | Example 2 | Example 3 | Example 4 | Example 5 | Example 6 |
|---|---|---|---|---|---|---|---|
| Peeling strength 165° C./25 s (0.15 mm) (kgf/cm) | 0 | 2.2 | 2.8 | 2.7 | 2.7 | 2.5 | 2.4 |
| Peeling strength 135° C./25 s (Double sided heating) (0.15 mm) (kgf/cm) | 0 | 2.1 | 2.4 | 2.5 | 2.3 | 2.2 | 2.3 |
| elastic recovery rate test of EN14704-1 (%) | 70 (180° C.) | 83 (160° C.) | 90 (160° C.) | 88 (160° C.) | 85 (160° C.) | 84 (160° C.) | 84 (160° C.) |

The above table clearly shows that whether the modifier is a single compound or a mixed compound, all kind of the finished product have better peeling strength and better elastic recovery rate. The modifier uses chlorine-containing 2,3,5,6-Tetrachloro-p-xylene-alpha, alpha'-diamine, although the peeling strength and elastic recovery rate are poor, but the polyester elastomer composite membrane has better flexibility. The polyester elastomer composite membrane of the comparative example 1 has a peeling strength of 0, cannot be bonded to textile materials, and the elastic recovery rate is not enough. The product of the comparative example cannot be restored to its original shape after being deformed.

The above is only a detailed description and drawings of the preferred embodiments of the present disclosure, but the features of the present disclosure are not limited thereto, and are not intended to limit the present disclosure. All the scope of the present disclosure shall be subject to the scope of the following claims. The embodiments of the spirit of the present disclosure and its similar variations are intended to be included in the scope of the present disclosure. Any variation or modification that can be easily conceived by those skilled in the art in the field of the present disclosure can be covered by the following claims.

What is claimed is:

1. A method of preparing a polyester elastomer composite membrane comprising the following steps:
    adding 0.5-20 parts by weight of a reaction solvent to thermoplastic polyester elastomer (TPEE) powder or granules to prepare a solvent mixture, the reaction solvent being methyl formate or ethyl acetate,
    adding 0.5-10 parts by weight of a modifier to at least one of: o-xylylenediamine; m-xylylenediamine; alpha,alpha'-diamino-p-xylene; 2,3,5,6-Tetrachloro-p-xylene-alpha,alpha'-diamine; and 1,3,5,7-Tetraazatricyclodecane;
    adding 0.5-20 parts by weight of an initiator to the first mixture, and mixing uniformly to prepare a second mixture, the initiator including a photo initiator or a thermal initiator, and
    drying the second mixture in an environment with a temperature between 95° C. to 115° C., and preparing the polyester elastomer composite membrane through an injection laminating process to laminate the second mixture with a layer of the polyester elastomer composite.

2. The method of preparing polyester elastomer composite membrane in claim 1, wherein the weight average molecular weight of the TPEE powder or granules is between 10000 and 30000, the Shore hardness of the TPEE powder or granules is between 50 A and 100 A, and the melting point of the TPEE powder or granules is between 40° C. to 180° C.

3. The method of preparing polyester elastomer composite membrane in claim 1, wherein the reaction solvent is used in the amount of 10 parts by weight; the modifier is used in amounts of 5 parts by weight, and the initiator is used in amounts of 10 parts by weight.

4. The method of preparing polyester elastomer composite membrane in claim 1, wherein the initiator and the first mixture are uniformly mixed at a rotation speed between 3 rpm to 7 rpm and at a temperature between 160° C. to 200° C. to form the second mixture.

5. The method of preparing polyester elastomer composite membrane in claim 4, wherein the rotation speed is 5 rpm, and the temperature is 180° C.

6. The method of preparing polyester elastomer composite membrane in claim 1, wherein the second mixture is dried in an environment with a temperature of 105° C.

* * * * *